United States Patent [19]

Nelvig

[11] Patent Number: 5,519,437
[45] Date of Patent: May 21, 1996

[54] METHOD FOR COMPENSATION OF DARK CURRENT OF CCD-SENSOR IN DENTAL X-RAYING

[75] Inventor: Per Nelvig, Sundsvall, Sweden

[73] Assignee: Regam Medical AB, Sundsvall, Sweden

[21] Appl. No.: 331,629

[22] PCT Filed: May 7, 1993

[86] PCT No.: PCT/SE93/00404

§ 371 Date: Nov. 7, 1994

§ 102(e) Date: Nov. 7, 1994

[87] PCT Pub. No.: WO93/23952

PCT Pub. Date: Nov. 25, 1993

[30] Foreign Application Priority Data

May 11, 1992 [SE] Sweden ................................. 9201482

[51] Int. Cl.⁶ ..................................................... H04N 3/14
[52] U.S. Cl. .......................... 348/162; 348/243; 378/98.8; 378/98.2
[58] Field of Search ..................... 348/243, 162; 378/98.2, 98.7, 98.8; 250/370.09

[56] References Cited

U.S. PATENT DOCUMENTS

| | | | |
|---|---|---|---|
| 4,467,351 | 8/1984 | Wang | 378/98.2 |
| 4,628,357 | 12/1986 | Fenster | 378/98.2 |
| 4,652,918 | 3/1987 | Liu et al. | 378/98.2 |
| 4,901,336 | 2/1990 | Nishiki | 378/98.8 |

FOREIGN PATENT DOCUMENTS 0415075   7/1990   European Pat. Off. .

*Primary Examiner*—Wendy R. Greening
*Attorney, Agent, or Firm*—Young & Thompson

[57] ABSTRACT

A method and a device for compensating dark currents of a CCD sensor in dental imaging utilizes a compensation signal to guarantee that picture elements within faintly exposed image areas in dental x-raying will be located within a desired signal level interval, which, on a video monitor, corresponds to a light intensity which would have been obtained had a dental x-ray film been used. In this manner, a maximum imaging sensitivity for gray level variations is obtained, thereby facilitating the imaging of enamel and dentine in dental x-raying. The strong dependence of the dark current upon ambient temperature is compensated by a signal processing device upon generation of raw data to achieve a maximum possible image quality and resolution. The imaging of enamel and dentine is facilitated by this dark current compensation and by a non-linear digitalization of the output of the image sensor.

10 Claims, 4 Drawing Sheets

METHOD FOR COMPENSATION OF DARK CURRENT OF CCD-SENSOR IN DENTAL X-RAYING

BACKGROUND OF THE INVENTION

1. Field of the Invention

The present invention relates to obtain on a display a curve of luminous flux corresponding to a photographic film when using an image sensor formed by a CCD member (Charge Coupled Device) instead of x-ray film for dental x-raying and more exactly to a method for compensation of dark current in the use of a CCD member for dental x-raying due to the CCD member having a strongly temperature and integration time dependent dark signal.

2. Description of the Related Art

In dental x-ray examinations small pieces of photographic film encapsuled in what could be called a cover to protect the film from light have for a long time been used, whereby said cover was being brought into the oral cavity. This film particularly adapted for exposure by x-ray radiation is in darkness developed after exposure and removal of the cover in a normal way, whereby an image is obtained where e.g. the jawbone and teeth will appear lighter in the film than for example soft tissues due to the difference in material density.

Today according to prior art the photographic film is replaced by electronic image sensors, usually in form of an image sensor of a CCD type (Charge Coupled Device). Such image sensing members are also frequently to be found in e.g. video technique but are then meant to especially operate within the wavelength range of visual light. The technique implies that immediately after the exposure with x-ray radiation a corresponding image is obtained for example on some type of display and thereby one avoids all of the developing process simultaneously as the radiation dose in most cases essentially is decreased due to that the image sensor itself may sense the necessary radiation dose to obtain the sufficient exposure. Such a system for dental x-raying named SEN-A-RAY is marketed for example by Regam Medical Systems AB, Sundsvall. When these images produced by the previously used dental x-ray film were evaluated, this was done by permitting light from behind to fall through the obtained image. The darkening of the film may be expressed by the optical density D as a function of the light intensity $I_1$ reaching the eye relative to the light intensity $I_0$ falling in.

$$D = \text{(optical density)} = 10 \log I_0/I_1$$

In a dental film, D is basically proportional to the exposure dose. If one thereby, according to FIG. 2, draws a graph of the light intensity as a function of the optical density D, a nonlinear curve having the largest slope at high material densities of the object within the interval marked by a in FIG. 2 is obtained, i.e. the areas in the exposed film corresponding to enamel and dentine. Thus it desirable that the intensity curve within this density range be as steep as possible to be able to discriminate small changes in e.g. the enamel of a tooth.

In the case of a CCD sensor an intensity value is obtained, which is proportional to the exposure, and primarily the film and the sensor in this respect have equal qualities. Upon the presentation of the signal from such a CCD sensor, a visualization is generally obtained where the relation between intensity of light on the display and D will be a linear function, as is exemplified in FIG. 3. But simultaneously as a high resolution of gray levels within the area comprising e.g. the enamel of a tooth is desired, also still a resolution is desired at high optical densities corresponding to portions more opaque to the x-ray radiation, to e.g. clearly be able to indicate an eventual root infection and the like. This is why the problem is not simply solved only by making the linear function steep within a limited density interval. Accordingly an image having the linear intensity imaging does not to the user appear quite similar compared to film images and may sometimes result in certain interpretation difficulties. This is why it is desirable to be able to present image data also on a video monitor having the logarithmic or non-linear curve of FIG. 2.

By utilization of different technical methods it is of course possible by hardware or software to transform the image from the CCD sensor presented at the display screen to have a corresponding non-linear relation between the intensity of light an the density of the imaged object. By such a method a transfer function may be obtained which offers a steep slope i corresponding to the y-direction within a certain desired interval along the x-axis of the graph.

Anyhow, one difficulty in this case is to be able to ensure that the steep portion of the curve really falls within the interesting influenced interval, as the reference point or starting point of the curve is not fixed because the dark current of the CCD sensor is highly dependent upon e.g. the surrounding temperature and the integration time as it is necessary to operate in a temperature interval between about 20° C. and 37° C., whereby the temperature of the sensor will vary between a temperature higher than room temperature and higher than the body temperature of 37° C. due to its own power dissipation and dependent on how much heat for example is transferred to the CCD cell within the oral cavity during the preparations before and also during the exposure and which at each different occasion for example is dependent of how the encapsuling of the CCD device transmits the environment temperature as well as how it makes contact to tissue and how exhalation air will affect the sensor. The necessary dose and consequently also the integration time will also vary from exposure to exposure because different objects require more or less dose to be penetrated. Thus, the integral of the dark current, the dark signal will be strongly dependent on both temperature and integration time.

In document U.S. Pat. No. 4,628,357 is disclosed a digital fluorographic system for the display of images of objects wherein by base line clipping an improvement is affected in the circuitry for log amplifying the video signal from a camera. However this is not intended for a single direct frame from a CCD cell, and utilizing fixed settings and clipping will not be a proper way to handle varying dark signal to obtain maximum sensitivity for faintly exposed areas of an image.

In another document U.S. Pat. No. 4,467,351 is disclosed a way to decrease the dose by deliberately underexposing the image on a film, an X-ray intensifier or the like and by means of a television camera enhancing the contrast by means of a digital imaging processor. The television camera then operates in a normal mode and does not produce only one single frame and here there are no measures taken regarding a possible dark signal which is highly dependent of the operating temperature as well as the integration time, which in the case of a CCD sensor for dental x-ray will be in a critically important range.

Thus, there is an obvious need to be able to control the influence of the dark signal on the starting point of the graph within the most interesting interval (marked by a in FIG. 2) of the contrast curve shown in FIG. 2 in the use of a CCD sensor. According to prior art this should normally be created by a simple transformation of the already digitized image signal by any suitable transfer function and eventually by means of a fixed compensation. A much better way should be to already from start dynamically depending on a precalculated dark signal component influence and lock the image signal within the correct amplitude interval before digitalization and thereby facilitate a further improved dynamics within the range of interest

SUMMARY OF THE INVENTION

A purpose of the present invention is a method and a corresponding device to solve the problem to, from an x-ray electronically detector generated image displayed on a video monitor primarily, obtain a curve of the intensity of light which corresponds to the curve of intensity of light obtained by means of ordinary film for dental x-raying, which film is illuminated from behind.

An additional purpose of the method and the device according to the present invention is to, by a dynamically precalculated correction signal obtain signal levels of the image elements within preferably weak exposed imaging areas falling within a desired signal level interval of the curve of light intensity, to thereby facilitate an improved dynamics and then to obtain maximum imaging sensitivity for, e.g., enamel and dentine in dental x-raying.

A third purpose of the method and the device according to the present invention is to compensate for the image sensor's strong dependence on e.g. ambient temperature regarding its dark current, exposure time and own power dissipation, by creating raw data for the image before the subsequent processing of this signal data to thereby make use of maximum possible image quality and gray level resolution.

BRIEF DESCRIPTION OF THE DRAWINGS

The invention will be described in preferred embodiments by means of the attached drawings and in which.

DESCRIPTION OF THE PREFERRED EMBODIMENTS

Figure 1:
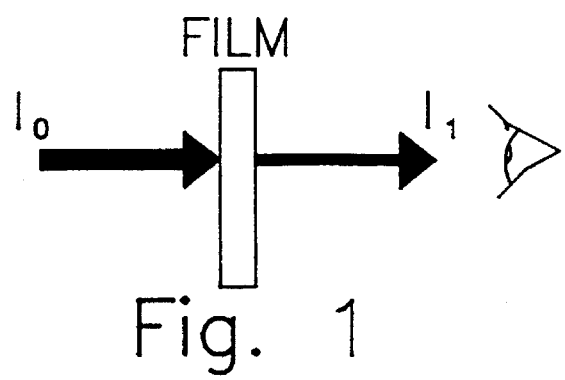
FIG. 1 illustrates the principe of an incident light intensity on a film and the corresponding viewed outgoing light intensity.
Figure 2:
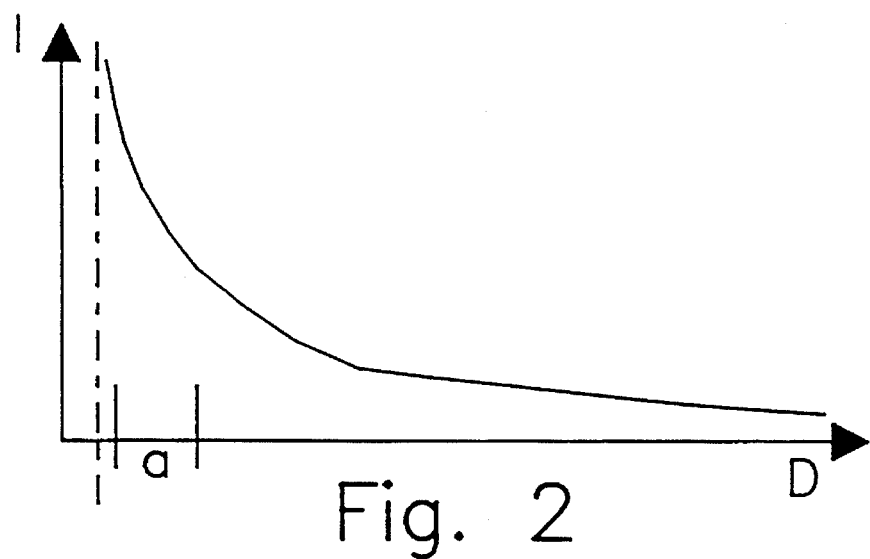
FIG. 2 shows exemplifying relation between light intensity and optical density in evaluation of dental x-ray images.
Figure 3:
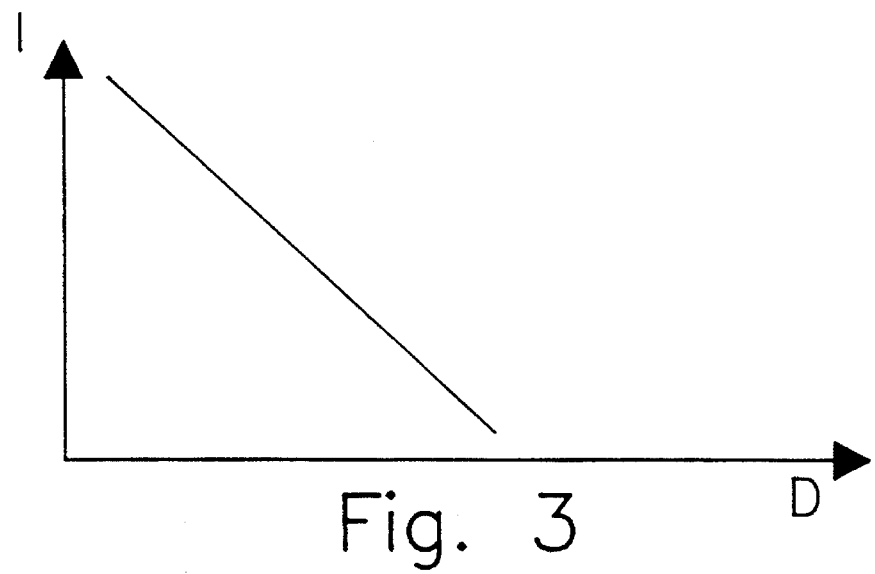
FIG. 3 depicts a typical relationship between light intensity and signal level of an image generated by a CCD sensor and presented on a linear video monitor.
Figure 4:
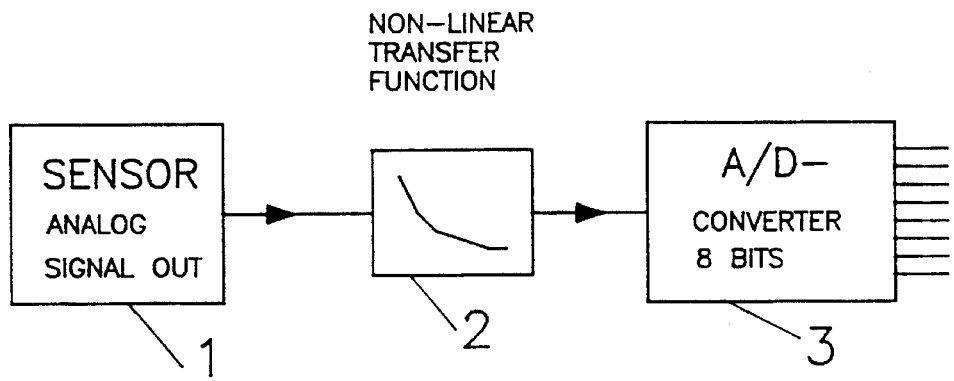
FIG. 4 is an example of transmission of analog signals from an image sensor via a device having a non-linear transfer function.

In FIG. 4 is in principle demonstrated an embodiment how the output signal of an image sensor 1 is processed to obtain a desired non-linear relationship between the light intensity on a display and the signal level, for example according to the graph of FIG. 2. The signal from the image sensor 1 will pass a unit 2 having a non-linear transfer function, e.g. according to a logarithmic curve, before the signal according to the example is digitized by means of an A/D converter 3 to be further processed, before the image is presented on a suitable video monitor. In the most simple embodiment the display in principle is connected directly after the unit 2 via only a suitable interface.

The unit 2 in the embodiment of FIG. 4 is constituted by an analog logarithmic amplifier. The logarithmic or non-linear transfer function is possible to obtain according to prior art in a multitude of ways, e.g., by means of combinations of diodes and resistors in a feedback loop and will not be explained here as the construction of that does not constitute any part of the invention as such.

Figure 7:
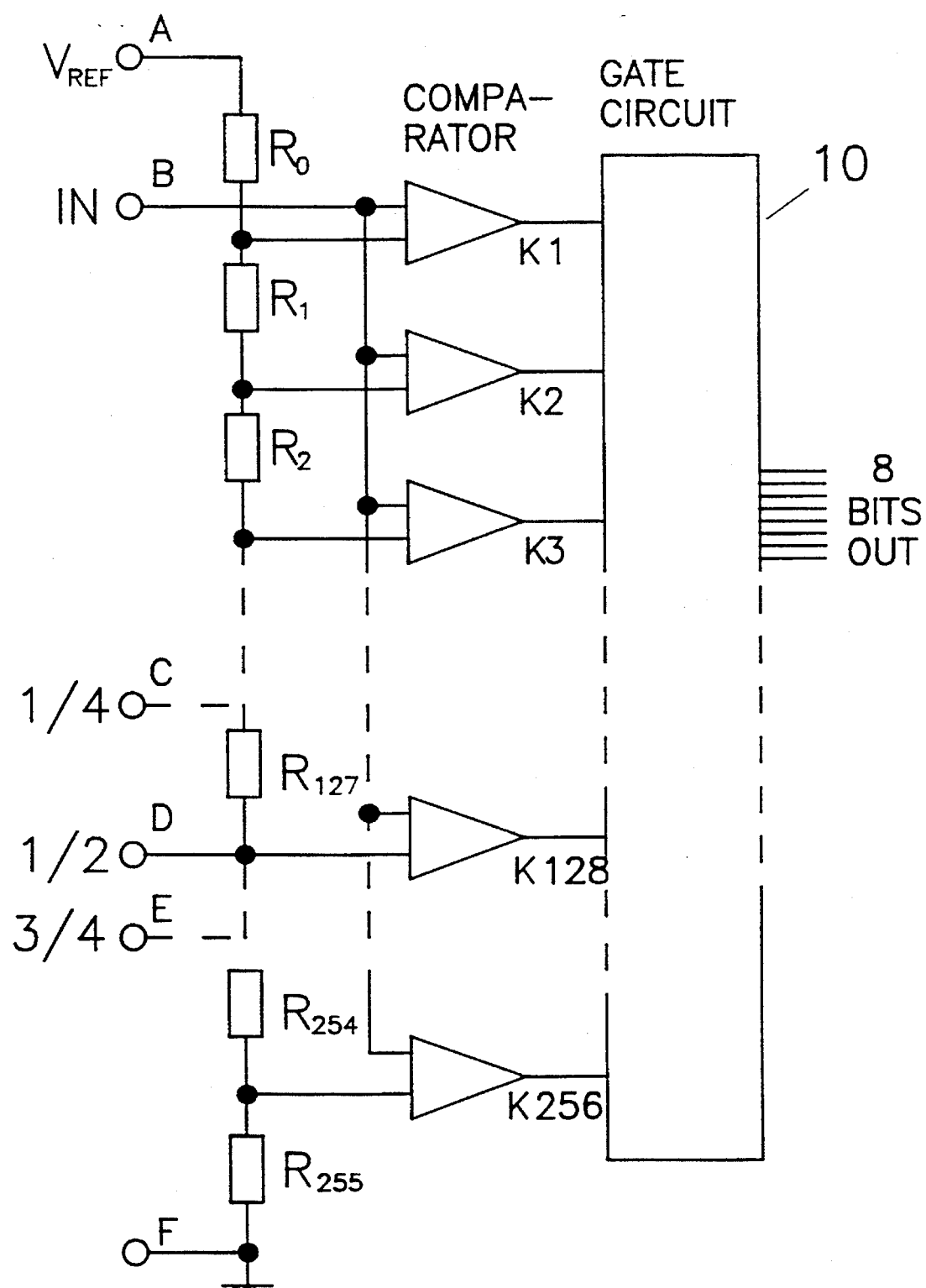
FIG. 7 illustrates an embodiment of an A/D converter having a possibility of changing linearity within four signal level intervals.

FIG. 7 shows more detailed an embodiment of an A/D converter suitable for use as the A/D converter 3 of the embodiment according to FIG. 4. The A/D converter according to this principle relies on a voltage divider having for example 256 different resistors $R_0$–$R_{255}$ which from a voltage reference $V_{REF}$ generates 256 different stepwise voltage levels each of which is fed to one input terminal of a corresponding comparator K1–K256. The analog signal B from each picture element achieved by the image sensor 1 is fed into the other input terminal of each comparator K1–K256. All comparators for which the input voltage B of the other input terminal exceeds the reference voltage at the first input terminal of the comparator give a logic level out, for example a "one", while the comparators for which the input voltage B of the other input terminal does not exceed the reference voltage of the first input terminal give out a logic "zero". The advantage of having all the comparators working simultaneously causes the analog-to-digital conversion to be fast. Via a gate circuitry this thus digitally represented value is translated into a binary number having for example 8 bits as in the embodiment and which binary number in a simple way may be handled by a processor, for example, in form of a personal computer. To be able to convert each picture element separately the ordinary clocking signals for the image sensor is used according to the state of the art to also synchronously control the gate circuit 10 such that a digital 8 bit word is transferred out for each picture element being fed into the input terminal B.

Figure 5:
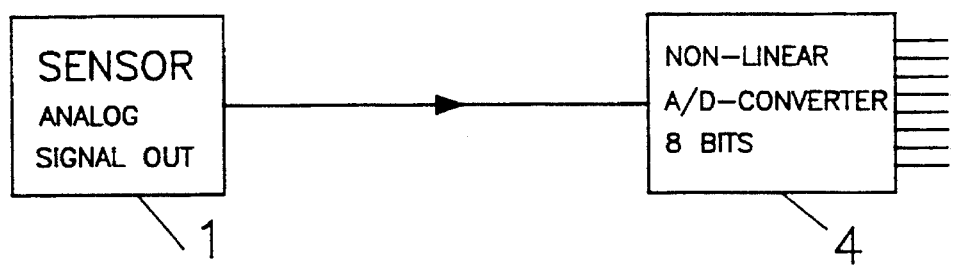
FIG. 5 is an example of transmission of analog signals from an image sensor via a non-linear A/D converter.

In FIG. 5 is demonstrated in another embodiment how the output signal from the image sensor 1 is carried directly to an A/D converter 4 which has a non-linear transfer function, i.e., it applies different sizes of amplitude steps to the digital representation of the picture elements signal upon the transmission from the image sensor 1.

An A/D converter according to FIG. 5 may be realized e.g. by making the resistors $R_0$–$R_{255}$ different whereby the comparator steps K1 to K256 will represent voltage steps which do not have the same step size in the conversion to the binary number in the embodiment having 8 bits. In the embodiment the circuitry shown in FIG. 7 constitutes one single component and then the different resistance values $R_0$–$R_{255}$ may not simply be changed. Anyhow this integrated component is available having extra terminals C, D and E at the resistors $R_{63}$, $R_{127}$, and $R_{191}$, respectively corresponding to ¼, ½ and ¾ of the resistance ladder. By parallel connection of a suitable resistor over each of the terminal pairs A–C, C–D, D–E, and E–F respectively a non-linear transfer function for the A/D conversion is achieved which demonstrates four different intervals having different slopes for the graph of the relationship between radiation intensity and signal level in the application shown in FIG. 5.

Figure 6:
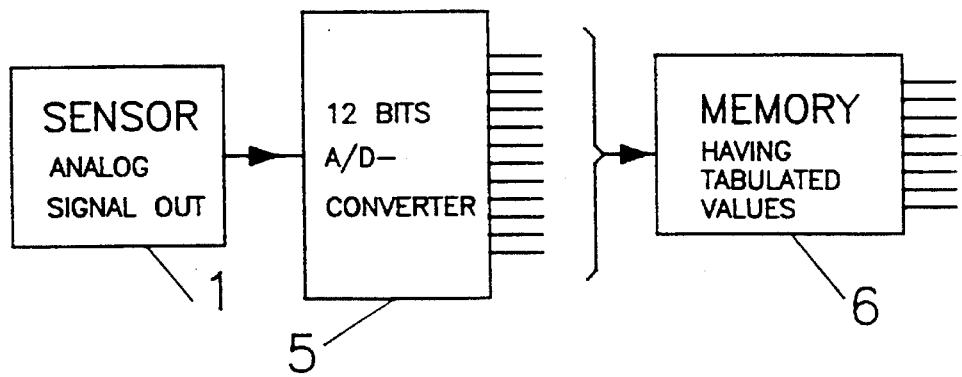
FIG. 6 shows an example of transmission of analog signals from an image sensor via a linear A/D converter having 12 bits and conversion of the value into a non-linear digital function by reading tabulated values from a memory.

FIG. 6 shows another alternative embodiment of the A/D converter in which a linear A/D converter 5 is used equivalent with the A/D converter 3, but preferably having a larger number of bits to obtain a satisfactory step resolution. The digital word obtained at the output terminal of the A/D converter 5 is used as an address to a memory 6 containing a table by means of which the values obtained from the converter 5 are translated into 8 bits data words, according to a logarithmic scale or any other suitable non-linear function, corresponding to what is achieved in the embodiment according to FIG. 5.

Figure 8:
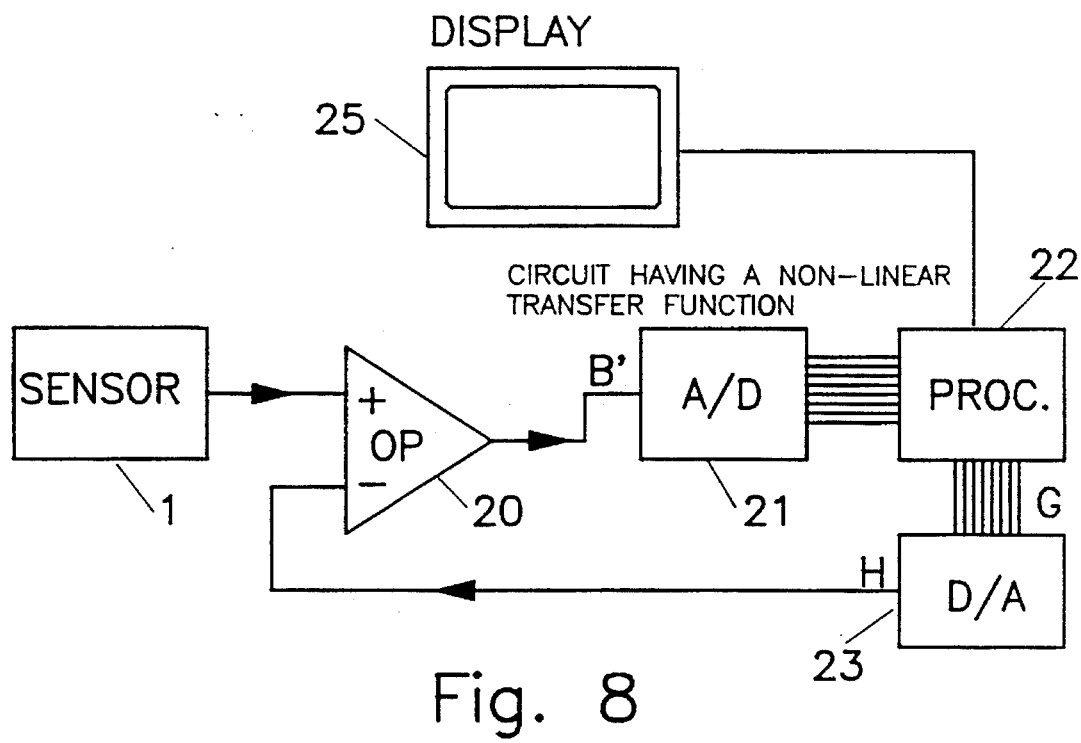
FIG. 8 depicts an embodiment of a device according to the invention to compensate dark signal of an image sensor.

FIG. 8 shows an embodiment of a total system according to the present invention. Analog image signals from the image sensor 1 are fed via a first input terminal into a device 20, which in this embodiment is an operational amplifier. An output signal B' from the device 20 is further fed into an A/D converter 21. The block 21 represent in principle, for example, any of the embodiments shown in FIG. 4 to FIG. 6. The output signal from the block 21 in the form of a digital word, in the demonstrated embodiment having 8 bits, is fed to a processor 22. In the embodiment the processor is a personal computer provided with a video monitor 25 on which the finally processed image is presented. The processor precalculates and weights a correction signal G which in digital form is fed to a D/A converter 23. In the D/A converter the digital correction signal is converted into an analog correction signal H, which is fed into a second input terminal of the device 20 and which adds this to or alternatively subtracts this feedback signal H from the signal from the image sensor 1 dependent on which is applicable.

While the image sensor 1 is standing by it is, according to known technique, continuously emptied of charges caused by the dark current resulting in its different picture element first of all due to the relatively high ambient temperature of the order 20°–37° C. In the processor thereby is precalculated a measure of this offset to which the device 20 should be set to compensate this dark signal such that a totally unexposed picture element should be exactly at the beginning of the signal level range marked by a in FIG. 2. By means of the multitude of picture element in the image sensor an image is integrated during the exposure of the image sensor by x-ray radiation simultaneously as the processor 22 calculates a further supplementary correction to the feedback signal H to the device 20 dependent of the exposure time starting from the previous established dark current correction, such that the least exposed picture elements will subsequent be just at the beginning of this interval a which has the steepest gradient in the relationship between signal level and material density to thereby obtain the best possible gray level resolution in the weakest exposed portions which principally correspond to enamel and dentine in the image obtained in connection with the dental examination.

Figure 9:
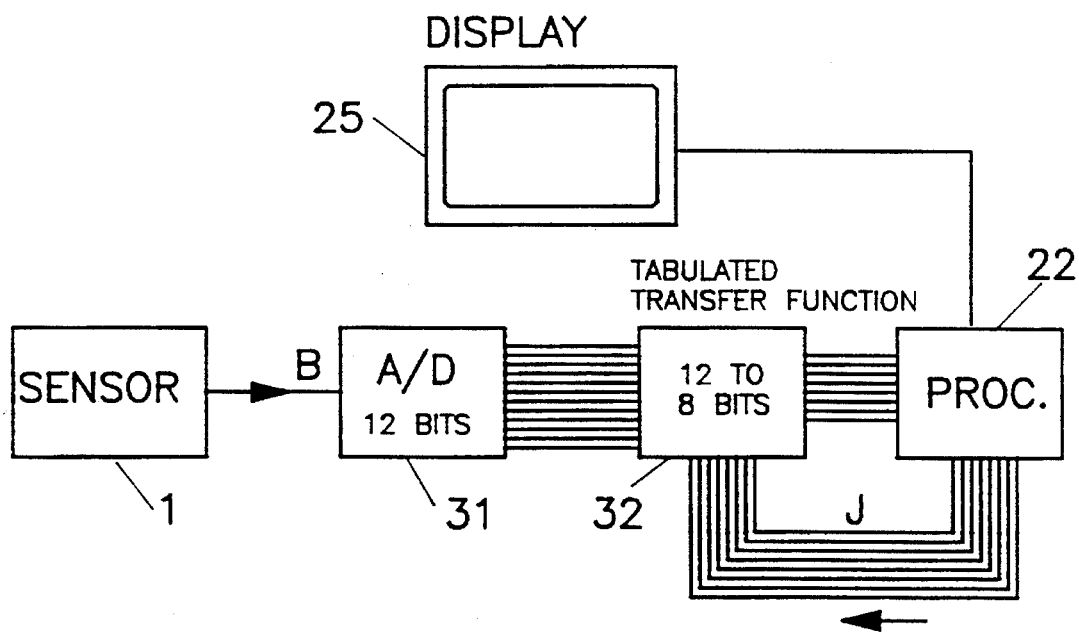
FIG. 9 shows an additional embodiment of a device according to the invention to compensate the output signal of an image sensor for dark current.

Finally in FIG. 9 is additionally shown another embodiment according to the present invention. The embodiment of FIG. 9 is demonstrating a solution utilizing the principal technique shown in FIG. 6, but having the addition that the processor 22 like the embodiment shown in FIG. 8 calculates a correction which is applied to the tabulated transfer function of the function block 32. The A/D converter 31 utilizes in this embodiment like in the block 5 of FIG. 6 a greater number of bits than what is finally applied to the processor 22. The tabulated corrected transfer function is transmitted from the processor 22 to the unit 32 which then preferably is constituting a RAM where the output from the A/D converter performs the memory addressing for the values to be read in the memory 32 and fed further to the processor 22 in form of corrected values for the respective picture element. The combination of memory 32 and processor 22 is additionally also possible to entirely be replaced by software with a suitable processor 22.

In a further different embodiment of the present invention is utilized a conventional linear A/D converter, eventually integrated with the processor, instead of the unit 21 having the non-linear transfer function, whereby the non-linear transfer function is obtained by software for a fast processor 22 according to the method discussed previously in connection with FIG. 9.

In the embodiments digital words, e.g., having a resolution of 8 bits, have been utilized, but of course it is possible to use any number of bits, anyhow preferably having a number being divisible by four to, for example, utilize a number of words having four bits. By such a higher contrast resolution having a greater number of bits it is, for example, possible to also present the image by means of pseudo colors, where different color shades eventually more easily could indicate differences in density than a pure gray scale on a display having a certain limited light dynamics. By experience though it has been noted that the black and white presentation so far has proven to be the most effective way of presentation in this application of dental x-ray images.

I claim:

1. A method for imaging dental x-ray images obtained from a CCD electronic image sensor which generates an output signal corresponding to each picture element of said image sensor, comprising the steps of:

exposing said image sensor to x-ray radiation;

obtaining an output signal from said image sensor;

transferring a level of said output signal obtained from said image sensor for each picture element, by a non-linear transfer function, to a new output signal level;

calculating a correction signal prior to and during an exposure of said image sensor to x-ray radiation, said correction signal being dependent on both a dark signal of said image sensor and an x-ray radiation exposure time of said image sensor;

compensating, by a compensation means, an amplitude of said new output signal level from each picture element of said image sensor using said calculated correction signal to thereby cause signal values of faintly exposed picture elements to be repositioned at a steepest portion of a signal level interval, said signal level interval corresponding to a curve relating signal level and material density, said compensated output signal corresponding to a predetermined intensity corresponding to a light intensity obtained using dental x-ray film; and displaying said compensated new output signal on a video display.

2. The method according to claim 1, wherein said compensating step is carried out by:

one of subtracting and adding said output signal obtained from said image sensor and said correction signal, said correction signal corresponding to said dark signal of said image sensor prior to x-ray radiation, to thereby maintain signal levels of unexposed picture elements at a beginning of said steepest portion of said signal level interval for maximum imaging sensitivity of said level transferred and compensated output signal on said video display.

3. The method according to claim 2, wherein said correction signal changes over time depending upon the time during which said image sensor is subjected to x-ray radiation and depending upon said dark signal in said image sensor prior to exposure with said x-ray radiation, to thereby shift said output signal corresponding to faintly exposed picture elements to said portion of said signal level interval having said steepest gradient to allow images of enamel and dentine in dental x-ray images to have said maximum imaging sensitivity.

4. The method according to claim 1, further comprising the step of:

converting said output signal from said image sensor to digital form, to thereby obtain a digital image sensor output signal, said compensating step being further carried out by digital compensation means, said calculated correction signal being a digital correction signal which depends on an initial dark current of said image sensor prior to the x-ray radiation and on a duration of said x-ray radiation.

5. Device for imaging dental x-ray images obtained from a CCD electronic image sensor comprising:

transfer means having a non-linear transfer function for transferring an output signal level obtained from each picture element of said image sensor to a new signal level corresponding to a light intensity obtained by light shining through an exposed and developed x-ray film;

compensation means connected to said transfer means, for compensating said new signal level of faintly exposed picture elements, to thereby reposition said new signal levels of said faintly exposed picture elements at a portion of a signal level interval having a steepest gradient, said signal level interval being a curve interrelating signal level and material density;

a processor connected to said transfer means, said processor generating a digital correction signal;

a D/A converter, connected to said processor, for converting said digital correction signal to an analog correction signal, said analog correction signal controlling said compensation means, a magnitude of said analog correction signal being dependent upon a dark signal of said image sensor prior to and during an exposure of said image sensor to x-ray radiation, said magnitude of said analog correction signal also being dependent upon a duration of exposure of said image sensor to said x-ray radiation.

6. Device according to claim 5, wherein said transfer means having said non-linear transfer function comprises an analog circuit having a logarithmic transfer function.

7. Device according to claim 5, wherein said transfer means having said non-linear transfer function comprises an analog-to-digital converter having one of a logarithmic stepwise non-linear transfer function and a logarithmic continuous non-linear transfer function.

8. Device according to claim 5, wherein said transfer means having said non-linear transfer function comprises an analog-to-digital converter and a digital memory connected to said analog-to-digital converter, said digital memory containing therein tabulated values of said non-linear transfer function.

9. Device according to claim 5, wherein said processor is a digital processor, and wherein said analog correction signal is fed back to said compensation means.

10. Device according to claim 5, wherein said correction signal, initially upon exposure of said image sensor to said x-ray radiation, corresponds to a measure of said dark current, and wherein, said processor, during said exposure to said x-ray radiation, controls said correction signal as a function of a duration of said exposure, such that a signal level of said picture elements corresponding to faintly exposed image areas will be located at said portion of said signal level interval having said steepest gradient.

* * * * *